June 20, 1950     H. HOOPER     2,511,983
VELOCITY CHECK VALVE
Filed May 18, 1945
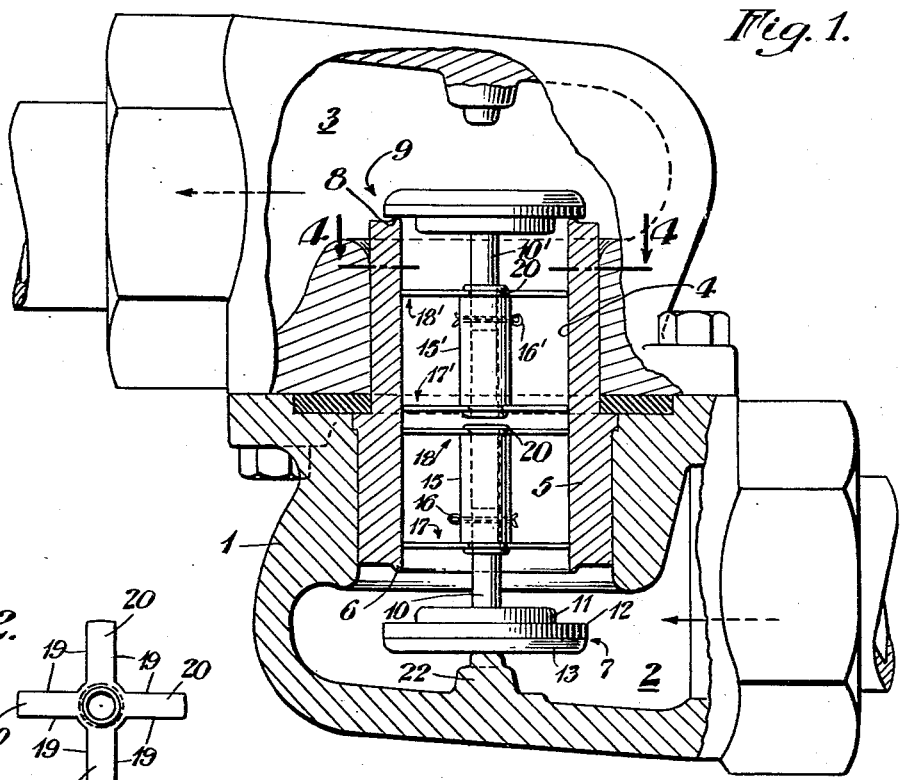
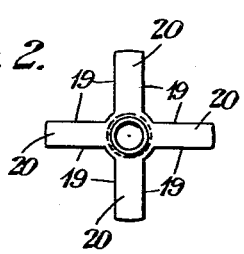
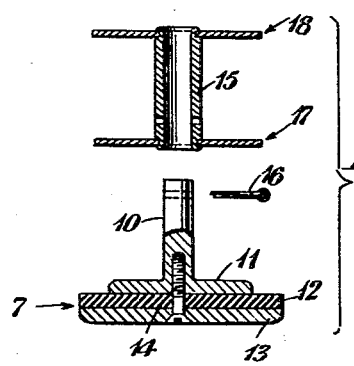
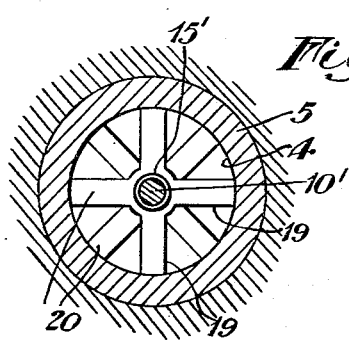
INVENTOR
Harry Hooper
BY
ATTORNEYS Patented June 20, 1950

2,511,983

UNITED STATES PATENT OFFICE 2,511,983

VELOCITY CHECK VALVE

Harry Hooper, New York, N. Y., assignor to Air Reduction Company, Incorporated, a corporation of New York Application May 18, 1945, Serial No. 594,503

7 Claims. (Cl. 277—71)

This invention relates to improvements in check valves, and more particularly to improvements in velocity check valve constructions suitable for use in double-acting check valves of the general type disclosed in the patent to G. M. Deming, No. 2,183,709.

Double-acting check valves of the type disclosed in the Deming patent are intended primarily for use in the acetylene lines of oxyacetylene cutting and welding apparatus, their purpose being to check back flow and to close or "lock-up" the line to prevent forward flow in case a hose breaks or if for some other reason the velocity of the gas exceeds a predetermined limit. The back flow is prevented by one valve element which is located at the upper end of a passage leading from the inlet chamber of the valve casing to the outlet chamber and which opens in the direction of the gas flow but is adapted to be closed by reverse flow of the gas. The forward flow of the gas is prevented, when the velocity of the forwardly flowing gas exceeds the predetermined limit, by another valve element located at the lower end of said passage and which opens against the gas flow and is normally open to permit forward flow of the gas, but is adapted to close when the velocity of the forward flow becomes sufficient to move it. This valve element may therefore be designated the velocity check valve element. Although the velocity check valve element closes in the direction of the gas flow, it is designed so that normally a gas flow of any velocity encountered in the ordinary use of the acetylene line will not cause it to close. In the past it has been conventional practice to select the gas velocity at which the velocity check valve element closes by regulating its spacing from the lip against which it closes. When this spacing is made greater, a higher gas velocity is required to close the valve element, and conversely, a smaller spacing will decrease the gas velocity at which the valve element will close. The disadvantage of this construction is that the correct spacing of the velocity check valve element from its lip has required accurate manufacturing and close tolerances since small variations in the spacing cause substantial differences in the gas velocity at which the valve element will close.

The principal object of this invention is to provide a velocity check valve element, or a double-acting check valve having a valve element which acts as a velocity check valve, in which the spacing of the velocity check valve from its lip is not so critical, thereby reducing the manufacturing cost and making the operation of the valve more reliable.

In accordance with the invention, the velocity check valve element has a valve-stem structure which extends into a cylindrical-wall passage leading from the inlet chamber of the valve casing to the outlet chamber thereof, and the valve-stem structure is provided with one or more centering guides in the form of thin plate, each of which has edge engagement with the wall of said passage and each of which is provided with at least one opening through which the gas flows, so that the pressure drop of the gas caused by its passage through the plate opening, or openings, lifts the velocity check valve element toward its seat and assists in its closing. Preferably, the openings in the thin plates are so formed that each plate is like a spider having radial arms of substantial width measured transversely of the direction of gas flow through the passage so that the velocity check valve element will be lifted toward closed position by the pressure drop of the gas passing around the spider arms. The spider arms, or equivalent solid portions of the thin plates, therefore constitute means for actuating the velocity check valve element in accordance with the velocity of flow of the gas. The check valve element for preventing reverse flow may also have a valve-stem structure extending into the cylindrical-wall passage and provided with similar centering guides which function in a similar manner to assist in opening this valve element.

A double-acting check valve embodying the invention is illustrated in the accompanying drawing, in which:

Fig. 1 is a side elevation, partly in section, of the valve;

Fig. 2 is a plan view of one of the centering guides or spiders;

Fig. 3 shows in vertical section one of the spider-carrying members and the velocity valve element disassembled; and Fig. 4 is a horizontal section taken on the line 4—4 of Fig. 1.

The valve comprises a housing 1 having an inlet chamber 2 and an outlet chamber 3. As indicated in Fig. 1, the gas flowing from the inlet chamber to the outlet chamber must flow upwardly through a cylindrical-wall passage 4 in a sleeve 5. The lower end of this sleeve has a lip 6 with which the velocity check valve element 7 cooperates. The upper end of the sleeve has a lip 8 with which the check valve element 9 cooperates for preventing reverse flow.

The detailed construction of the velocity check valve element is shown at the lower part of Fig. 3. It has a stem 10 at the lower end of which there is a flange 11. If desired, this flange may be integral with the stem. The face of the valve element which contacts with the lip 6 is a disc 12, preferably of soft rubber, clamped against the flange 11 by a plate 13. A screw 14 is threaded into the end of the valve stem 10 for clamping the plate 13 to the flange 11 with the rubber disc in between. The check valve element 9 for preventing reverse flow of the gas may be of similar construction.

The upper end of the valve stem 10 fits into the lower end of a sleeve 15 and is held therein in any suitable way, as by means of a cotter pin 16 passing transversely through openings in the sleeve and an aligned opening in the valve stem. The sleeve 15 carries one or more of the centering guides above referred to. In the preferred form of the valve the sleeve 15 carries two of such guides 17 and 18, one being secured to the lower end of the sleeve and the other to its upper end. Each guide is a thin plate having edge engagement with the cylindrical wall of the passage 4 in the sleeve 5. Each of the thin plates is provided with one or more openings to permit the gas to flow by the plate. Preferably, there are four of such openings 19, as best shown in Fig. 2, so formed in the plate that the solid remaining portion of the plate forms four radially extending arms 20, the outer ends of which engage with the cylindrical wall of the passage 4. Thus, it will be seen that each of the plates is shaped like a spider having radially extending arms of substantial width measured transversely of the direction of gas flow through the passage 4.

Each of the spider-like centering guides may be secured to the sleeve 15 in any suitable way. For instance, the extreme ends of the sleeve may be of reduced diameter and inserted through central openings in the guides and then peened over, so that the assembly forms a spool-like device, as best shown in Fig. 3.

The check valve element 9 for preventing reverse flow of the gas has a downwardly projecting valve stem 10' corresponding to the valve stem 10 of the velocity check valve element. It is inserted into the upper end of a second sleeve 15' having centering guides 17' and 18' (Fig. 1) forming a second spool-like device similar to the one to which the stem of the valve element 7 is connected. The lower end of the valve stem 10' may be fastened in the upper end of the sleeve 15' by a cotter pin 16'. Thus, in the preferred form of the valve there are two spool-like devices, one for each check valve element and each having two spider-like centering guides. The sleeve of each spool-like device is in effect an extension of the valve-stem of the corresponding check valve element, and therefore each valve-stem and its attached sleeve constitute what might be called a valve-stem structure for the corresponding valve element. Hence, it may be said that the two centering guides of each pair are connected to the valve-stem structure of the valve element with which they are associated.

The corresponding radial arms of the centering guides may be in vertical alignment or in staggered relation when viewed from above, as indicated in Fig. 4.

The velocity check valve element 7 normally rests on a boss 22 extending up from the bottom wall of the valve casing. This valve element is therefore normally open and permits the gas to flow from the inlet chamber 2 upwardly through the passage 4 into the outlet chamber 3. The check valve element 9 is lifted from its seat by the forward flow of the gas, but it is obvious that it will close to prevent any back flow of the gas.

The velocity check valve element 7 is intended to close when the velocity of the forwardly flowing gas exceeds a predetermined limit, as above stated, but it is obvious that ordinarily the valve would have to be accurately manufactured with close tolerances in order that the spacing between the velocity check valve element and its lip 6 is just right to cause the valve element to close at the desired gas velocity. The centering guides above described not only guide the valve-stem structure in the gas passage 4, but they assist in lifting the velocity check valve element 7 when the gas reaches the velocity at which it is desired that the velocity valve element close. The pressure drop in the gas caused by its passage through the openings 19 in the centering guides and around the radial arms 20 of substantial width lifts the centering guides and also the velocity check valve element connected to them.

The check valve element 9 can be opened by the gas flow without moving the velocity check valve element 7. Its centering guides 17' and 18' function to assist in lifting it in the same manner that the centering guides 17 and 18 function to assist in lifting the velocity check valve element.

I claim:

1. A valve comprising a housing having a gas inlet chamber and gas outlet chamber, an elongated passage connecting said chambers within the housing and through which gas entering said inlet chamber must flow upwardly to reach said outlet chamber, a valve element adjacent the lower end of said passage, a valve seat at the lower end of said passage with which the valve element cooperates, said valve element being normally open but arranged to close in the direction of normal gas flow through said passage and adapted to be closed by the flow of gas when it exceeds a predetermined velocity, said valve element having a valve-stem structure extending upwardly into said passage, and guiding means for the valve element positioned wholly in said elongated passage and comprising at least one spider connected to said valve stem structure and having radially extending arms the ends of which engage with the wall of said passage, said arms having surfaces which face the gas stream flowing through said passage and which are of substantial width transversely of the direction of gas flow through the passage, whereby when the flow of gas exceeds a predetermined velocity said valve element is lifted toward its seat by the pressure drop of the gas passing around the spider arms.

2. A double-acting check valve comprising a housing having a gas inlet chamber and gas outlet chamber, an elongated passage connecting said chambers within the housing and through which gas entering said inlet chamber must flow upwardly to reach said outlet chamber, a check valve element adjacent the upper end of said passage, a valve seat at the upper end of said passage with which said check valve element cooperates, said check valve element opening in the direction of normal gas flow through said passage and adapted to be closed by reverse flow of the gas, a velocity check valve element adjacent the lower end of said passage, a valve seat at the lower end of said passage with which the velocity check valve element cooperates, said velocity check valve element being normally open but arranged to close in the direction of normal gas flow through said passage and adapted to be closed by the flow of gas when it exceeds a predetermined velocity, a valve-stem structure on each of the check valve elements extending into said passage, and a plurality of thin plates connected to each of said valve-stem structures at positions spaced apart axially of said passage, each of said plates having edge engagement with the wall of said passage and each plate having a surface which faces the gas stream flowing through said passage and also having at least one opening through which the gas flows, whereby when the flow of gas exceeds a predetermined velocity said check valve elements are lifted by the pressure drop of the gas caused by its passage through the openings in each of said plates.

3. A valve comprising a housing having a gas inlet chamber and gas outlet chamber, an elongated passage connecting said chambers within the housing and through which gas entering said inlet chamber must flow to reach said outlet chamber, a valve element adjacent the entrance end of said passage, a valve seat at the entrance end of said passage with which the valve element cooperates, said valve element being normally open but arranged to close in the direction of normal gas flow through said passage and adapted to be closed by the flow of gas when it exceeds a predetermined velocity, said valve element having a valve-stem structure extending into said passage, and guiding means for the valve element positioned wholly in said elongated passage and comprising a thin plate connected to said valve-stem structure and having edge engagement with the wall of said passage, said plate having a surface which faces the gas stream flowing through said passage and also having at least one opening through which the gas flows, whereby when the flow of gas exceeds a predetermined velocity said valve element is moved toward its seat by the pressure drop of the gas caused by its passage through the opening or openings in said plate.

4. A valve comprising a housing having a gas inlet chamber and gas outlet chamber, an elongated passage connecting said chambers within the housing and through which gas entering said inlet chamber must flow to reach said outlet chamber, a valve element adjacent the entrance end of said passage, a valve seat at the entrance end of said passage with which the valve element cooperates, said valve element being normally open but arranged to close in the direction of normal gas flow through said passage and adapted to be closed by the flow of gas when it exceeds a predetermined velocity, said valve element having a valve-stem structure extending into said passage, and guiding means for the valve element positioned wholly in said elongated passage and comprising a spider connected to said valve stem structure and having radially extending arms the ends of which engage with the wall of said passage, said arms having surfaces which face the gas stream flowing through said passage and which are of substantial width transversely of the direction of gas flow through the passage, whereby when the flow of gas exceeds a predetermined velocity said valve element is moved toward its seat by the pressure drop of the gas passing around the spider arms.

5. A valve comprising a housing having a gas inlet chamber and gas outlet chamber, an elongated passage connecting said chambers within the housing and through which gas entering said inlet chamber must flow to reach said outlet chamber, a valve element adjacent to one end of said passage, a valve seat at the end of said passage with which the valve element cooperates, said valve element having a valve-stem structure extending into said passage, and a plurality of thin plates connected to said valve-stem structure at positions spaced apart axially of said elongated passage, each of said plates having edge engagement with the wall of said passage and each plate having a surface which faces the gas stream flowing through said passage and also having at least one opening through which gas flows, whereby said spaced plates constitute guiding means for the valve element and whereby when the flow of gas exceeds a predetermined velocity the valve element is moved relative to its seat by the pressure drop of the gas caused by its passage through the opening or openings in said plates.

6. A valve comprising a housing having an inlet chamber and an outlet chamber and a passage connecting said chambers for the flow of gas between said chambers, a valve element commanding said passage and movable substantially axially of said passage between open and closed positions, guide means connected with the valve element and movable as a unit with said valve element, at least a portion of said guide means extending into the gas passage and contacting with the wall of said passage to maintain the valve element in substantial alignment with the passage, said guide means having a surface in said passage extending transversely of the direction of the gas flow through the passage and facing the gas stream flowing therethrough, whereby the pressure of the gas against said surface, when the velocity thereof exceeds a predetermined value, will move the valve element toward its closed position.

7. A velocity check valve comprising a housing having an inlet chamber and an outlet chamber and a passage connecting said chambers for the flow of gas between said chambers, a valve element commanding said passage and movable substantially axially of said passage between open and closed positions, and combined guide and valve-actuating means in said passage including structure connected to the valve element and having a surface within the gas passage extending transversely across and facing a portion of the gas stream and also having guide surfaces that contact with the wall of the passage to maintain the valve element in substantial alignment with the passage.

HARRY HOOPER.

REFERENCES CITED

The following references are of record in the file of this patent:

UNITED STATES PATENTS

| Number | Name | Date |
| --- | --- | --- |
| 526,327 | Schetzel | Sept. 18, 1894 |
| 534,568 | McDougal | Feb. 19, 1895 |
| 551,858 | Gold | Dec. 24, 1895 |
| 1,985,570 | Haven | Dec. 25, 1934 |
| 2,183,709 | Deming | Dec. 19, 1939 |

FOREIGN PATENTS

| Number | Country | Date |
| --- | --- | --- |
| 46,198 | Austria | Jan. 25, 1911 |
| 174,840 | France | 1886 |
| 435,929 | France | 1913 |